(12) United States Patent
Zhang et al.

(10) Patent No.: US 11,756,529 B2
(45) Date of Patent: Sep. 12, 2023

(54) METHOD AND APPARATUS FOR SPEECH RECOGNITION, AND STORAGE MEDIUM

(71) Applicant: BEIJING BAIDU NETCOM SCIENCE AND TECHNOLOGY CO., LTD., Beijing (CN)

(72) Inventors: Liao Zhang, Beijing (CN); Xiaoyin Fu, Beijing (CN); Zhengxiang Jiang, Beijing (CN); Mingxin Liang, Beijing (CN); Junyao Shao, Beijing (CN); Qi Zhang, Beijing (CN); Zhijie Chen, Beijing (CN); Qiguang Zang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 253 days.

(21) Appl. No.: 17/123,253

(22) Filed: Dec. 16, 2020

(65) Prior Publication Data

US 2021/0375264 A1 Dec. 2, 2021

(30) Foreign Application Priority Data

May 28, 2020 (CN) .......................... 202010469985.8

(51) Int. Cl.
G10L 15/02 (2006.01)
G06F 40/12 (2020.01)
G06F 40/30 (2020.01)
G06F 7/78 (2006.01)
G06F 17/16 (2006.01)
G10L 15/26 (2006.01)

(52) U.S. Cl.
CPC ............... *G10L 15/02* (2013.01); *G06F 7/78* (2013.01); *G06F 17/16* (2013.01); *G06F 40/12* (2020.01); *G06F 40/30* (2020.01); *G10L 15/26* (2013.01); *G10L 2015/025* (2013.01)

(58) Field of Classification Search
CPC ......... G10L 15/00; G10L 15/02; G10L 15/26; G10L 2015/025; G06F 40/00; G06F 40/12; G06F 40/30; G06F 7/00; G06F 7/78; G06F 17/00; G06F 17/16
See application file for complete search history.

(56) References Cited

U.S. PATENT DOCUMENTS

| | | | | |
|---|---|---|---|---|
| 8,442,821 | B1* | 5/2013 | Vanhoucke | ............. G10L 15/14 704/232 |
| 2004/0172247 | A1* | 9/2004 | Yoon | ..................... G10L 15/187 704/E15.02 |
| 2005/0060138 | A1* | 3/2005 | Wang | .................... G06F 40/289 704/1 |
| 2006/0259301 | A1 | 11/2006 | Guohong et al. | |
| 2015/0302848 | A1 | 10/2015 | Kurata et al. | |
| 2015/0364141 | A1 | 12/2015 | Lee et al. | |
| 2017/0091169 | A1* | 3/2017 | Bellegarda | .............. G10L 15/16 |
| 2019/0013009 | A1* | 1/2019 | Pinson | ................... G10L 15/197 |
| 2020/0219486 | A1* | 7/2020 | Fu | ............................ G10L 15/02 |
| 2021/0183373 | A1* | 6/2021 | Moritz | ...................... G06N 3/08 |

FOREIGN PATENT DOCUMENTS

| | | |
|---|---|---|
| CN | 1280697 A | 1/2001 |
| CN | 1512308 A | 7/2004 |
| CN | 103578467 A | 2/2014 |
| CN | 105989833 A | 10/2016 |
| CN | 108510990 A | 9/2018 |
| CN | 109243428 A | 1/2019 |
| CN | 110111775 A | 8/2019 |
| CN | 110335592 A | 10/2019 |
| CN | 110610707 A | 12/2019 |
| CN | 110675886 A | 1/2020 |
| CN | 110689876 A | 1/2020 |
| CN | 110990632 A | 4/2020 |
| CN | 111048082 A | 4/2020 |
| CN | 111144138 A | 5/2020 |
| JP | H05324718 A | 12/1993 |
| JP | H0675943 A | 3/1994 |
| JP | 2018028848 A | 2/2018 |

(Continued)

OTHER PUBLICATIONS

S. Zhang, M. Lei, Y. Liu and W. Li, "Investigation of Modeling Units for Mandarin Speech Recognition Using DFSMN-CTC-sMBR," ICASSP 2019—2019 IEEE International Conference on Acoustics, Speech and Signal Processing (ICASSP), 2019, pp. 7085-7089, doi: 10.1109/ICASSP.2019.8683859 (Year: 2019).*

Nakamura Sorami, "Office Action for JP application 2020-214927", dated Jan. 18, 2022, JPO, Japan.

Shiyu Zhou et al., "Syllable-based sequence-to-sequence speech recognition with the transformer in mandarin Chinese", Institute of Automation, Chinese Academy of Sciences and University of Chinese Academy of Science, Jun. 4, 2018 China.

Haoneng Luo et al., "Simplified Self-Attention for Transformer-based End-to-End Speech Recognition", Audio, Speech and Language Processing Grouo, School of Computer Science,, Northwestern Polytechincal University, Xi'an, China and Speech Lab, Alibaba DAMO Acadamy, May 21, 2020, China.

(Continued)

*Primary Examiner* — Paras D Shah
*Assistant Examiner* — Sean E Serraguard
(74) *Attorney, Agent, or Firm* — Bridgeway IP Law Group, PLLC; Jihun Kim

(57) ABSTRACT

Proposed are a method and apparatus for speech recognition, and a storage medium. The specific solution includes: obtaining audio data to be recognized; decoding the audio data to obtain a first syllable of a to-be-converted word, in which the first syllable is a combination of at least one phoneme corresponding to the to-be-converted word; obtaining a sentence to which the to-be-converted word belongs and a converted word in the sentence, and obtaining a second syllable of the converted word; encoding the first syllable and the second syllable to generate first encoding information of the first syllable; and decoding the first encoding information to obtain a text corresponding to the to-be-converted word.

16 Claims, 7 Drawing Sheets

(56) References Cited

FOREIGN PATENT DOCUMENTS

JP          2021176022 A     11/2021
WO    WO-2014035437 A1 *  3/2014  ............. G10L 15/22

OTHER PUBLICATIONS

Zhao You et al., "Dfsmn—San with Persistent Memory Model for Automatic Speech Recognition", IEEE, 2020, pp. 7704-7708.

Kazuhiko Kakehi et al., "Phoneme/syllable perception and the temporal structure of speech".

Yu Shi, "Research on Chinese Word Segmentation Based on Deep Learning", Nanjing University of Posts and Telecommunications, May 2019, pp. 1-62, China.

CNIPA Examiner, "Office Action for CN application 202010469985.8", dated Jul. 2, 2021, CNIPA, China.

Elko Zimmermann, "Search Report for EP application 20216638.5", dated May 26, 2021, EPO, Germany.

* cited by examiner

METHOD AND APPARATUS FOR SPEECH RECOGNITION, AND STORAGE MEDIUM

CROSS-REFERENCE TO RELATED APPLICATION

The present application is based upon and claims priority to Chinese Patent Application No. 202010469985.8, filed on May 28, 2020, the entirety contents of which are incorporated herein by reference.

TECHNICAL FIELD

Present disclosure relates to the field of speech processing technology, in particular to the field of natural language processing technology, and in particular to a method and apparatus for speech recognition, and a storage medium.

BACKGROUND

With the development of science and technology, natural language processing (NLP) is an important means in human-computer interaction, and the attention mechanism can effectively capture the importance of words in the context and improve the effectiveness of natural language understanding tasks.

SUMMARY

The present disclosure provides a method and apparatus for speech recognition, and a storage medium.

In embodiments of the present disclosure, there is provided a method for speech recognition, including: obtaining audio data to be recognized; decoding the audio data to obtain a first syllable of a to-be-converted word, in which the first syllable is a combination of at least one phoneme corresponding to the to-be-converted word; obtaining a sentence to which the to-be-converted word belongs and a converted word in the sentence, and obtaining a second syllable of the converted word; encoding the first syllable and the second syllable to generate first encoding information of the first syllable; and decoding the first encoding information to obtain a text corresponding to the to-be-converted word.

In embodiments of the present disclosure, there is provided an apparatus for speech recognition, including: a non-transitory computer-readable medium including computer-executable instructions stored thereon, and an instruction execution system which is configured by the instructions to implement at least one of: a first obtaining module, configured to obtain audio data to be recognized; a second obtaining module, configured to decode the audio data to obtain a first syllable of a to-be-converted word, in which the first syllable is a combination of at least one phoneme corresponding to the to-be-converted word; a third obtaining module, configured to obtain a sentence to which the to-be-converted word belongs and a converted word in the sentence, and obtain a second syllable of the converted word; an encoding module, configured to encode the first syllable and the second syllable to generate first encoding information of the first syllable; and a decoding module, configured to decode the first encoding information to obtain a text corresponding to the to-be-converted word.

In embodiments of the present disclosure, there is provided a non-transitory computer-readable storage medium having computer instructions stored thereon, in which the computer instructions are configured to cause a computer to execute a method for speech recognition. The method includes: obtaining audio data to be recognized; decoding the audio data to obtain a first syllable of a to-be-converted word, in which the first syllable is a combination of at least one phoneme corresponding to the to-be-converted word; obtaining a sentence to which the to-be-converted word belongs and a converted word in the sentence, and obtaining a second syllable of the converted word; encoding the first syllable and the second syllable to generate first encoding information of the first syllable; and decoding the first encoding information to obtain a text corresponding to the to-be-converted word.

It should be understood that the content described in this section is not intended to identify key or important features of the embodiments of the present disclosure, nor is it intended to limit the scope of the present disclosure. Other features of the present disclosure will be easily understood by the following description.

BRIEF DESCRIPTION OF THE DRAWINGS

The drawings are used to better understand this solution, and do not constitute a limitation to the present disclosure, wherein.

DETAILED DESCRIPTION

Description will be made below to example embodiments of the present disclosure in conjunction with accompanying drawings, which includes various details of embodiments of the present disclosure to facilitate understanding and should be regarded as merely examples. Therefore, it should be recognized by the skilled in the art that various changes and modifications may be made to the embodiments described herein without departing from the scope and spirit of the present disclosure. Meanwhile, for clarity and conciseness, descriptions for well-known functions and structures are omitted in the following description.

The recognition accuracy of speech recognition using the attention mechanism in the related technology depends on the completeness of the sentence. Therefore, as the length of the sentence increases, the amount of calculation in the recognition will soar, which will seriously affect the recognition speed.

A method and apparatus for speech recognition, electronic device, and storage medium of embodiments of the present disclosure are described below with reference to the accompanying drawings.

Figure 1:
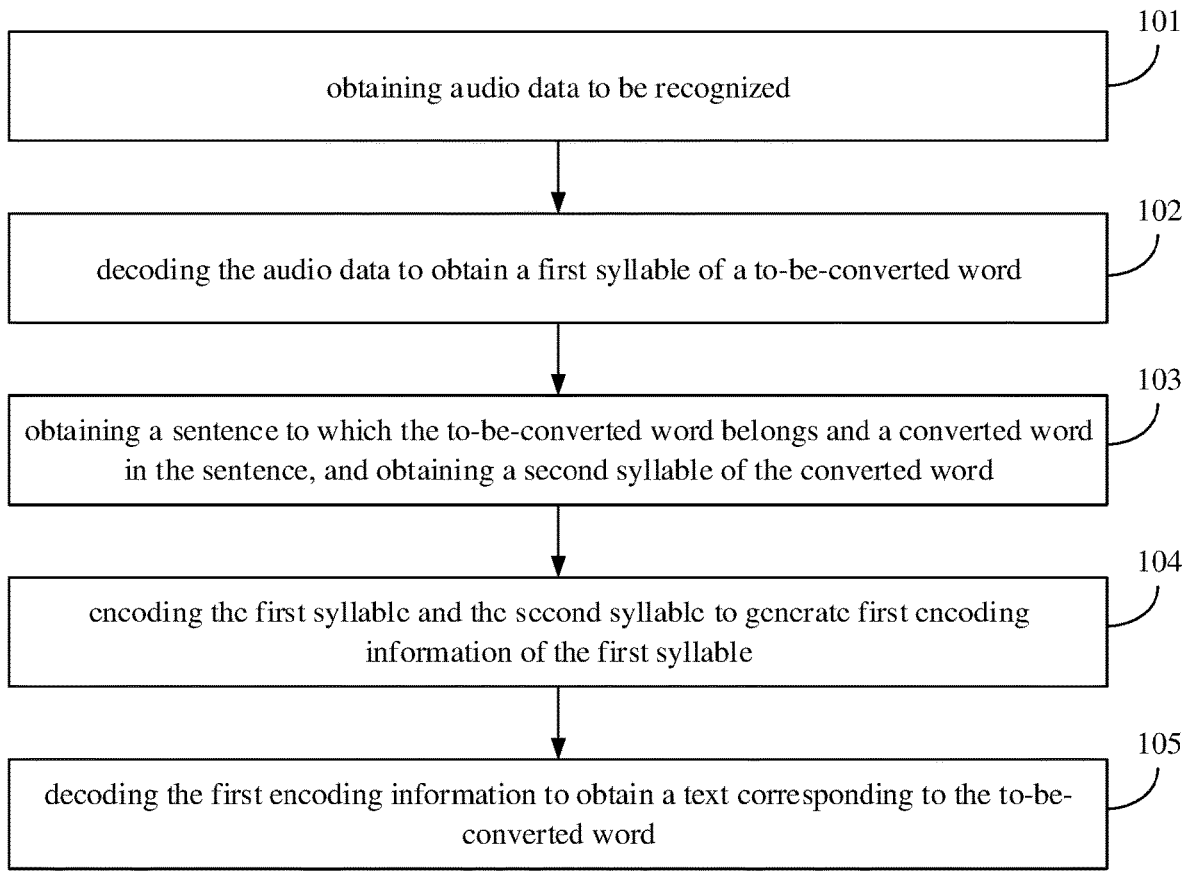
FIG. 1 is a flowchart of a method for speech recognition provided by an embodiment of present disclosure.

FIG. 1 is a flowchart of a method for speech recognition provided by an embodiment of present disclosure. It should be noted that the executive body of the method for speech recognition in this example is an apparatus for speech recognition, and the apparatus for speech recognition may be an electronic device with a human-computer interaction function, such as a PC (Personal Computer), a tablet computer, a handheld computer or a mobile terminal, etc., there is no limitation here, or the software in other hardware devices with human-computer interaction functions.

As shown in FIG. 1, the method for speech recognition of the embodiment of the present disclosure includes the following steps.

In step 101, the audio data to be recognized is obtained.

The audio data may be obtained in real time by a radio device of an electronic device with a human-computer interaction function, or may be obtained from data pre-stored in a local or remote storage area.

In step 102, the audio data is decoded to obtain a first syllable of a to-be-converted word.

The first syllable is a combination of at least one phoneme corresponding to the to-be-converted word.

It should be noted that the phoneme is the smallest phonetic unit defined based on the natural attributes of the phonetic. An action constitutes a phoneme, and a combination of at least one phoneme constitute a syllable. For example, the syllable of the Chinese character "哦 (which means "oh" in English)" is composed of a phoneme of "o". The syllable of Chinese character 爱 (which means "love" in English" is composed of two phonemes "a" and "i", and the syllable of the Chinese character "我 (which means "I" in English)" is composed of two phonemes "w" and "o".

It should also be noted that the first syllable of the to-be-converted word can be determined by searching for the optimal path in the decoding space formed by the acoustic model and the language model.

It should be understood that, in the embodiment of the present disclosure, the audio data is decoded in streaming decoding, that is, the audio in the audio data is decoded word by word to obtain the first syllable of the to-be-converted word one by one. That is to say, when the present disclosure decodes audio data to obtain syllables, each time a syllable is recognized, a syllable is input to the subsequent encoding module, so that the subsequent encoding module and decoding module can analyze word by word to achieve speech-to-text processing in steaming mode.

In step 103, a sentence to which the to-be-converted word belongs and a converted word in the sentence are obtained, and a second syllable of the converted word is obtained.

It should be noted that the self-attention mechanism for speech-to-text conversion (or, syllable-to-character conversion) is implemented in the present disclosure. The key of the self-attention mechanism is to use other words in the text to enhance the semantic representation of the target word. That is, for the to-be-converted word, the word before the to-be-converted word in the sentence to which the to-be-converted word belongs has a certain impact on the semantics of the to-be-converted word. Therefore, it is necessary to obtain the second syllable of the word before the to-be-converted word in the sentence to which the to-be-converted word belongs. The obtained second syllable is combined with the first syllable of the to-be-converted word, so as to recognize the semantics of the to-be-converted word.

Moreover, because the present disclosure performs speech-to-text processing in a streaming mode, that is, all syllables before the to-be-converted word are converted to text. Therefore, the words before the to-be-converted word can be called converted words, that is, it can be directly obtained the second syllable of the converted word in the sentence to which the to-be-converted word belongs.

The sentence to which the to-be-converted word belongs can be identified based on the pause duration of the language habit. For example, in the foregoing decoding process, by judging the pause duration between each syllable and the previous syllable, it is determined whether each syllable belongs to the same sentence as the previous syllable. Optionally, it can be judged whether the pause duration is greater than the first preset time, and in case that the pause duration is greater than or equal to the first preset time, the current syllable is determined as the first word of the sentence.

In a case that the previous syllable and the current syllable belong to two sentences respectively, there is no converted word in the sentence to which the current syllable belongs. If the pause duration is smaller than the first preset time, it is determined that the current syllable is not the first word of the sentence, and the current syllable and the previous syllable belong to the same sentence, the text corresponding to the previous syllable is the converted word in the sentence to which the current syllable belongs, and the judgment of the first word of the sentence is continued based on the previous syllable, until the first word of the sentence to which the current syllable belongs is obtained, and the previous syllables of all converted words between the previous syllable to the first word are obtained. For example, when a certain syllable is recognized as the first word of the sentence, the initial character is configured in the forepart of the syllable. Optionally, the initial character can be <begin>, and the second syllables between the current syllable and the starting character are obtained.

In some embodiments, it is also possible to judge whether the current syllable belongs to the same sentence as the previous syllable based on the semantics of the converted word. For example, if the previous syllable is determined to be the last word of the sentence based on the semantics, the current syllable is determined to be the first word of the sentence, if it is judged that the previous syllable is not the first word of the sentence based on semantics, it is determined that the current syllable and the previous syllable belong to the same sentence.

In step 104, the first syllable and the second syllable are encoded to generate first encoding information of the first syllable.

In step 105, the first encoding information is decoded to obtain a text corresponding to the to-be-converted word.

That is to say, in embodiments of the present disclosure, by encoding the first syllable of the to-be-converted word and the second syllable of the converted word, the converted word before the first syllable contained in the first encoding information have an impact on text corresponding to the first syllable. Therefore, by decoding the first encoding information, text can be decoded based on the impact of the preceding text.

Figure 2:
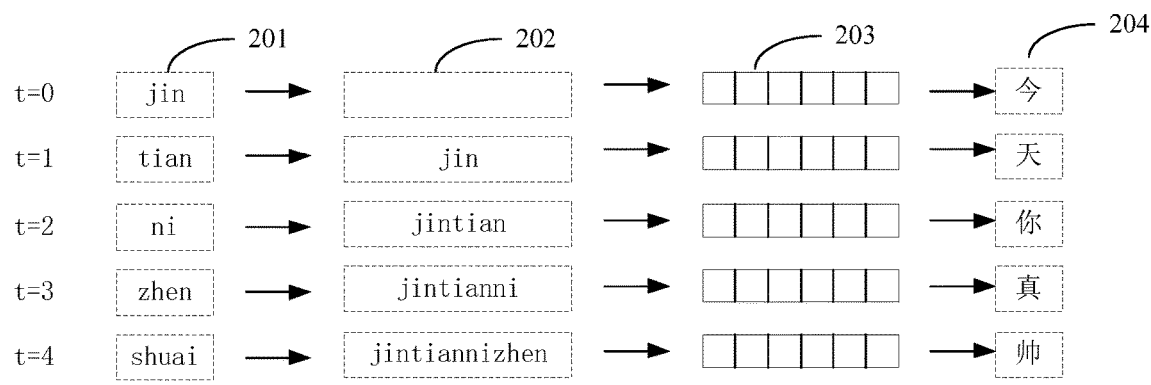
FIG. 2 is a schematic diagram of the principle of a method for speech recognition provided by an embodiment of the application.

For example, as shown in FIG. 2, each text in a sentence is decoded into a first syllable 201 based on time sequence, the second syllable 202 corresponding to the converted word before the syllable is obtained, and the first encoding information 203 of the first syllable is obtained by encoding, the first encoding information 203 is then decoded to obtain the text 204 corresponding to the to-be-converted word. For example, at time t1, the first syllable 201 "tian" is obtained, and the second syllable 202 converted word before the first syllable 201 is "jin". At time t2, the first syllable 201 "ni" is obtained, and the second syllable 202 of converted word before the first syllable 201 is "jintian". At time t3, the first syllable 201 "zhen" is obtained, and the second syllable 202 of converted word before the first syllable 201 is "jintianni" At time t4, the first syllable 201 "shuai" is obtained, and the second syllable 202 of the converted word before the first syllable 201 is "jintiannizhen".

Therefore, the present disclosure can encode the current to-be-converted word based on the current to-be-converted word and the converted word in the sentence to which the to-be-converted word belongs. During the encoding process, only the influence of the previous converted word on the to-be-converted word is considered, and the subsequent words of the to-be-converted word are no longer considered. The efficiency of speech-to-text conversion is effectively improved while ensuring accuracy, without the need of inputting the entire sentence of the to-be-converted word. Further, by performing the speech-to-text conversion based on the above-mentioned encoding, since the encoding information of the to-be-converted word is obtained on the basis of the converted word, not only the amount of calculation for encoding and conversion is reduced, but also a real-time speech-to-text translation of the to-be-converted word may be achieved because the influence of the following words does not need to be considered.

Figure 3:
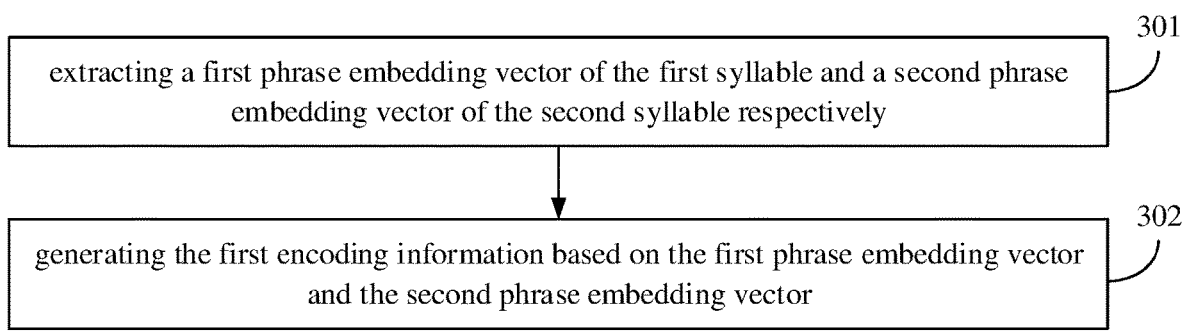
FIG. 3 is a flowchart of a method for speech recognition provided by another embodiment of present disclosure.

In order to further explain the previous embodiment clearly, as shown in FIG. 3, the above step 104 in which the first syllable and the second syllable are encoded to generate first encoding information of the first syllable may include following steps.

In step 301, a first phrase embedding vector of the first syllable and a second phrase embedding vector of the second syllable are extracting respectively.

It should be noted that the phrase embedding vector express the syllable in a vector that can be mathematically processed. A pre-trained syllable-phrase embedding vector model, such as Word2Vec, Glove, or transformer, can be used to obtain the phrase embedding vector of each syllable separately.

It should be understood that, for the to-be-converted word, when the to-be-converted word is not the first word of the sentence, the sentence to which the to-be-converted word belongs contains at least one converted word, that is, there are multiple converted words, and each converted word contains a second syllable, that is, when obtaining the phrase embedding vector of the second syllable, the corresponding phrase embedding vector can be obtained for each second syllable; when the to-be-converted word is the first word of the sentence, there is no converted word in the sentence, so there is no actual second syllable. At this time, the zero vector can be used as the phrase embedding vector of the second syllable. It should also be understood that when the sentence contains more words, the converted word at the forepart of the sentence has less influence on the first syllable, that is, the degree of influence of the second syllable on the first syllable may be related to the distance between the first syllable and the second syllable. Therefore, in order to further reduce the amount of calculation, it is also possible to obtain only a preset number of second syllables before the first syllable, and phrase embedding vectors of the preset number of second syllables.

In step 302, the first encoding information is generated based on the first phrase embedding vector and the second phrase embedding vector.

That is to say, the present disclosure first converts syllables into phrase embedding vectors that can be mathematically transformed. In order to ensure the semantic accuracy of the to-be-converted word, encoding is performed based on the phrase embedding vectors of the words that have been converted (converted words) and the to-be-converted word, and then the first encoding information corresponding to the first syllable may be obtained.

Therefore, the present disclosure converts the syllable data into vector information that can be mathematically processed through the phrase embedding vector, thereby facilitating the encoding of the first syllable.

It should be noted that the syllables recognized in present disclosure are encoded one by one. Therefore, before encoding the currently recognized first syllable of the to-be-converted word, the previous converted word has been encoded, and the to-be-converted word will not affect the encoding information of the previously converted words. Therefore, in present disclosure, the encoding information of the first syllable can be directly generated based on the encoding information of the converted words.

Optionally, in present disclosure, a trained speech-to-text model can be used to encode and decode the first syllable, where the encoding component of the speech-to-text model can save the encoding state of the previous syllable, and when encoding the first syllable, the speech-to-text model can multiplex the encoded state of the converted word buffered in its encoding component, that is, when encoding the first syllable, the saved encoding state is directly read from the buffer, and the encoding increment of the first syllable is spliced with the encoding information of the previous syllable to obtain the first encoding information of the first syllable, so that there is no need to repeatedly calculate the encoding content of the converted word when encoding the first syllable, which will greatly improve the speed of syllable-to-text conversion.

Figure 4:
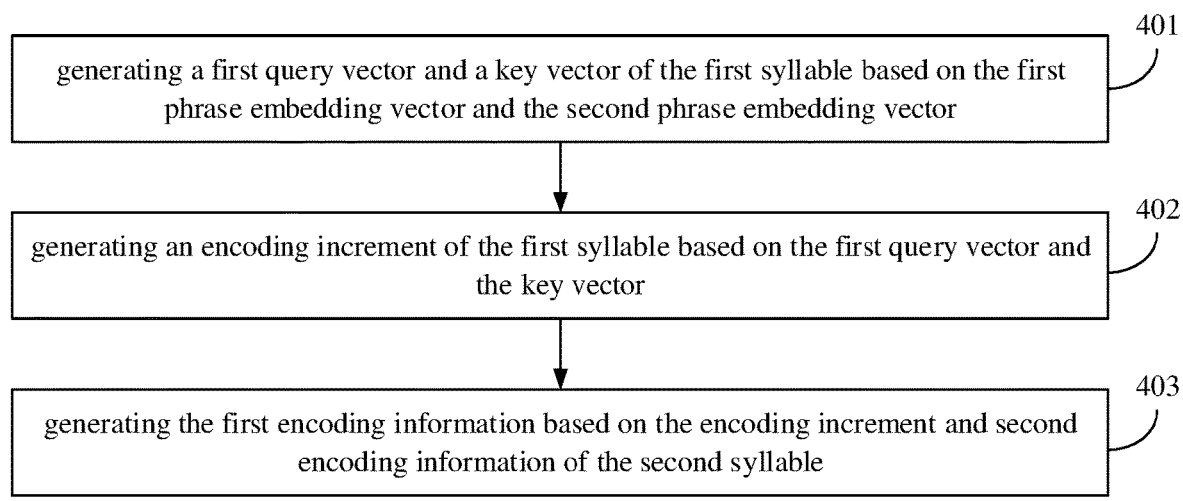
FIG. 4 is a flowchart of a method for speech recognition provided by yet another embodiment of present disclosure.

In the following, the step 302 in which the first encoding information is generated based on the first phrase embedding vector and the second phrase embedding vector will be illustrated using the syllable-to-text model as the transformer model. As shown in FIG. 4, the step 302 includes the following steps.

In step 401, a first query vector and a key vector of the first syllable are generated based on the first phrase embedding vector and the second phrase embedding vector.

In some embodiments, the first query vector of the first syllable is constructed based on the phrase embedding vector of the first syllable, the second query vector of each second syllable is constructed by using the phrase embedding vector of each second syllable, and the first query vector is spliced with the second query vector to generate the key vector.

In step 402, an encoding increment of the first syllable is generated based on the first query vector and the key vector.

In some embodiments, the self-attention weight matrix of the first syllable can be generated based on the first query vector and the key vector, the value vector of the first syllable can be generated based on the first syllable and the second syllable, and the value vector is weighted based on the self-attention weight matrix to generate the encoding increment.

Further, generating the self-attention weight matrix of the first syllable based on the first query vector and the key vector may include: obtaining a transposed vector of the key vector; multiplying the first query vector by the transposed vector to generate a first matrix; and normalizing the first matrix to generate the self-attention weight matrix.

In step 403, the first encoding information is generated based on the encoding increment and second encoding information of the second syllable.

In some embodiments, the encoding increment can be spliced with the second encoding information to obtain the first encoding information.

That is to say, in the embodiment of the present disclosure, the query vector of the first syllable is the initial increment. During the encoding process, the increment of the first syllable is combined with the state data such as key vectors and value vectors in the encoding process of the second syllable that has been saved, thereby realizing the encoding process of the first syllable without repeating the processing of the second syllable.

Figure 5:
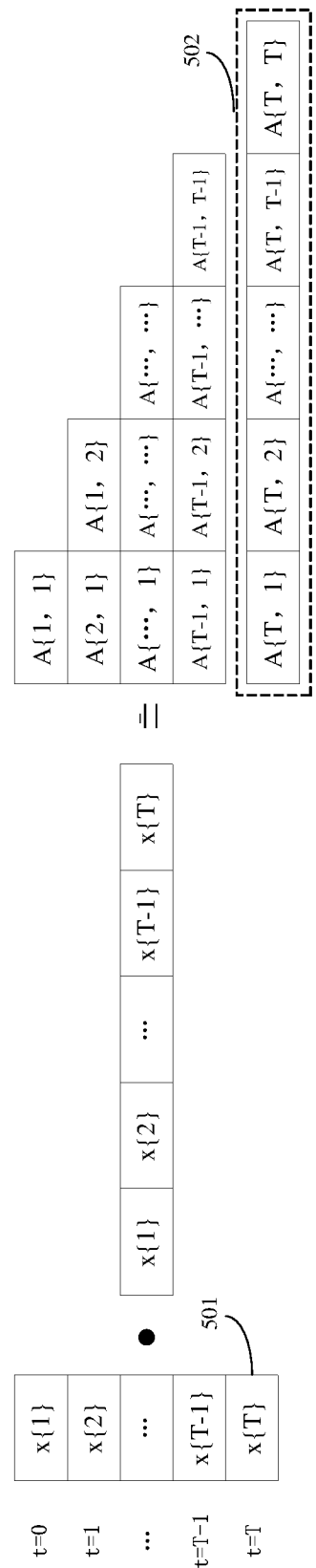
FIG. 5 is a schematic diagram of the encoding principle of a method for speech recognition provided by an embodiment of present disclosure.

For example, as shown in FIG. 5, the phrase embedding vector corresponding to the first syllable 501 inputted at the current time T is obtained and used as the query vector Q=x{T}, and the query vector of the first syllable is spliced with the query vector of each second syllable from the first time moment T=1 to the previous moment T-1 as the key vector K=x{1, 2, . . . , T-1, T} of the first syllable. The value vector is the same as the key vector, which is V=x{1, 2, . . . , T-1, T}.

Then, a dot multiplication is performed on the transposition $K^T$ of the key vector K and the query vector Q of the first syllable to obtain the influence weight of each second syllable on the first syllable, which can be marked as the first matrix, and then the first matrix is normalized to obtain the self-attention weight matrix, that is, the sum of the influence weights of multiple second syllables on the first syllable is 1.

Optionally, the following formula can be used to obtain the self-attention weight matrix:

$$\text{Attention}(Q, K, V) = \text{softmax}\left(\frac{QK^T}{\sqrt{d_k}}\right)V,$$

where $d_k$ is the number of columns of the Q and K matrix, that is, a vector dimension.

Further, since the first syllable is the original increment of the entire encoding process, the calculation result based on the query vector Q is also the increment. For example, as shown in FIG. 5, based on the query vector Q and the key vector K of the first syllable, the encoding increment 502 of the first syllable may be generated.

It should be noted that from the matrix structure shown in FIG. 5, it can be seen that since there is no need to consider the influence of the text after the to-be-converted word on the to-be-converted word, the obtained complete first syllable encoding information is a diagonal matrix structure, and the impact of the first syllable at the current moment on the entire encoding information is only on the last row of the matrix, that is, the encoding increment 502. Therefore, present disclosure proposes to multiplex the encoding information of the second syllable, so that the encoding component only needs to increase the encoding information. The increment part is the only part that the encoding component should calculate, and the efficiency of phonetic conversion can be effectively improved while ensuring accuracy.

It can be seen that present disclosure can calculate the encoding increment of the first syllable based on the query vector of the first syllable of each to-be-converted word and the key vector generated after splicing, and then the encoding increment is spliced with encoding increment of each converted word to obtain the first encoding information, that is, replacing the calculation generation process by multiplexing the encoding information of the converted words, thereby effectively improving the efficiency of syllable conversion and the speed of speech translation.

Figure 6:
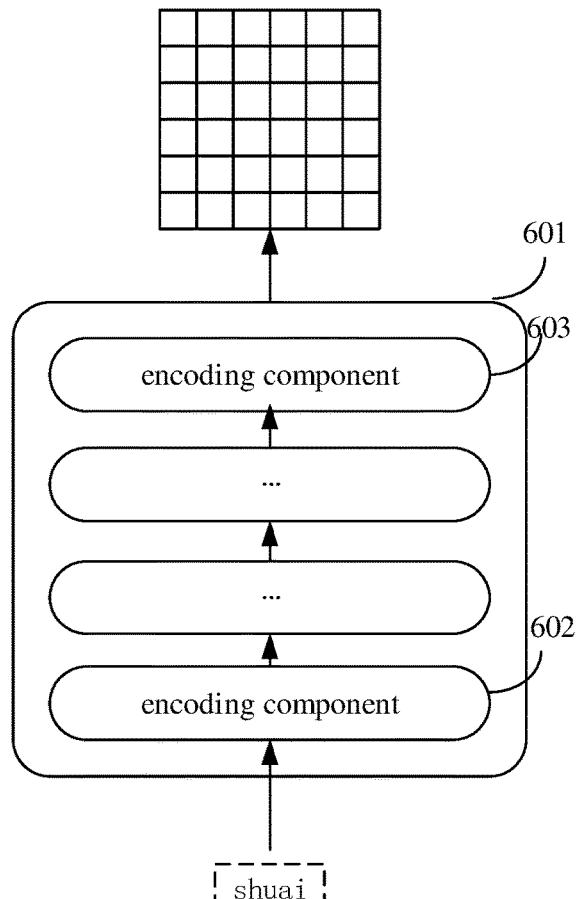
FIG. 6 is a schematic structure diagram of the encoder used in the transformer model in an embodiment of the present disclosure.

Further, the structure of the encoder in the transformer model is introduced. As shown in FIG. 6, the encoder 601 includes N encoding components, and N is a positive integer. When N is greater than 1, the first to N-th encoding components are sequentially connected.

In the first encoding component 602, a first query vector is generated based on the phrase embedding vector of the first syllable, and the first query vector is spliced with the second query vector of each second syllable to obtain the key vector of the first syllable.

In the i-th encoding component 603, the encoding increment of the first syllable obtained by the previous encoding component (that is, by the (i-1)th encoding component) is used as the first query vector of the first syllable in the current encoding component, and the first encoding information of the first syllable obtained by the previous encoding component is used as the key vector of the first syllable in the current encoding component, in which i is a positive integer greater than 1 and less than or equal to N.

The current transformer model usually uses an encoder with 6 encoding components.

Figure 7:
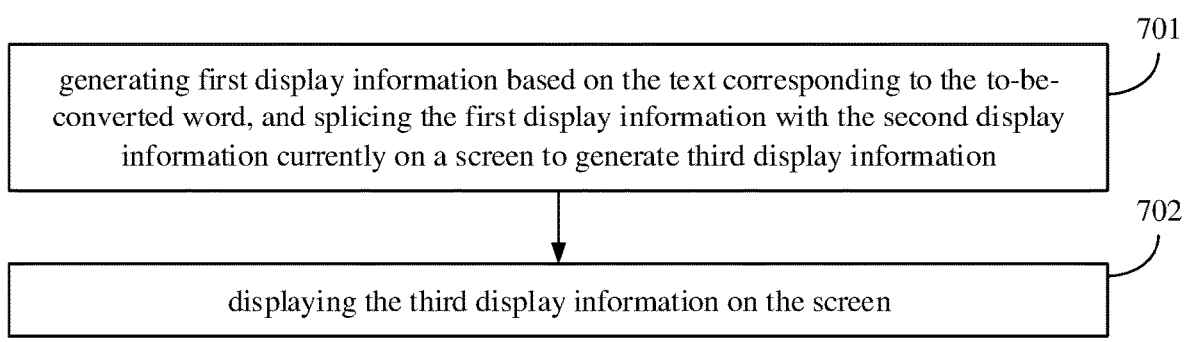
FIG. 7 is a flowchart of a method for speech recognition provided by still another embodiment of present disclosure.

In some embodiments, as shown in FIG. 7, the method for speech recognition may further include the following steps after obtaining the text corresponding to the first syllable.

In step 701, first display information is generated based on the text corresponding to the to-be-converted word, and the first display information is spliced with the second display information currently on a screen to generate third display information.

In step 702, the third display information on the screen is display.

That is to say, the present disclosure can realize word-by-word on-screen display based on streaming syllable conversion, that is, converting words one by one and displaying the words one by one, the first display information of the text corresponding to the current to-be-converted word is spliced with the second display information of the converted word which has been displayed on the screen to generate the third display information, and the third display information is displayed on the screen, so as to realize a seamless connection between the conversion and display, so that the user can clearly feel the effect of the audio data conversion in streaming.

In some embodiments, semantic analysis may be performed on the third display information to predict a number of words in the sentence, a display position of the third display information on the screen based on the number may be determined, and the third display information may be controlled to be displayed on the display position.

It should be noted that the number of bytes displayed in each line in different display areas is fixed. When displaying different numbers of words, the word spacing is usually adjusted automatically as the number of words increases. When the content displayed on the screen is in the end of the line, it is easy to produce a state of constant adjustment, which affects the user's reading experience. Therefore, the present disclosure determines the word content of the sentence by adding speech analysis before displaying on the screen, thereby determining the display position of the third information on the screen, avoiding screen flicker and other effects at the end of the line.

In some embodiments, a number of words in the third display information may be obtained, and word spacing in the third display information may be adjusted based on the number.

That is to say, the number of words in the third display information may be obtained when generating the third display information, and word spacing in the third display information may be adjusted based on the number, and the third display information may be displayed with the determined word spacing on the screen.

Figure 8:
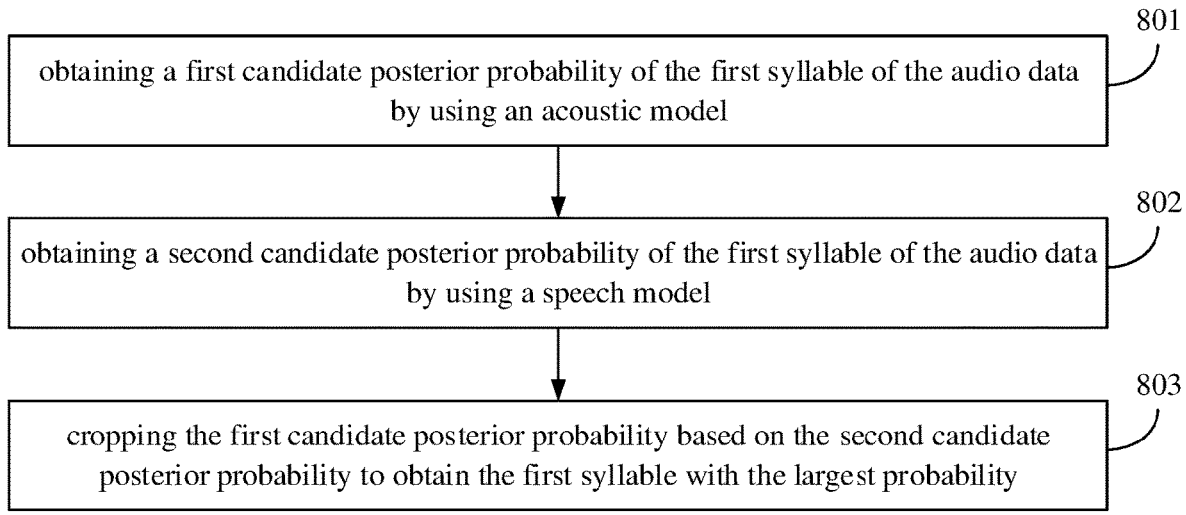
FIG. 8 is a flowchart of a method for speech recognition provided by yet still another embodiment of present disclosure.

In some embodiments, as shown in FIG. 8, the above step 102 includes following steps.

In step 801, a first candidate posterior probability of the first syllable of the audio data is obtained by using an acoustic model.

In step 802, a second candidate posterior probability of the first syllable of the audio data is obtained by using a speech model.

In step 803, the first candidate posterior probability is cropped based on the second candidate posterior probability to obtain the first syllable with the largest probability.

It should be noted that the input of the acoustic model is the speech feature, the first candidate posterior probability is the syllable posterior probability, the input of the speech model is the syllable string, and the second candidate posterior probability is the occurrence probability of the syllable string. Both the posterior probability and the posterior probability of the syllable string can express the syllable information of the to-be-converted word, and the difference lies in the different expression forms. Further, the syllable with the largest probability and overlapping between the two posterior probabilities can be used as the first syllable of the to-be-converted word.

In summary, based on the technology of present disclosure, it is possible to encode the current to-be-converted word based on the to-be-converted word and the converted word in the sentence to which it belongs. During the encoding process, only the impact of the previous converted word on the to-be-converted word is considered. Then the impact of the text after the to-be-converted word is no longer considered. The efficiency of phonetic conversion will be effectively improved while ensuring accuracy, without the need to input the entire sentence of the speech to be converted. Further, based on the above-mentioned encoding to perform phonetic conversion, since the encoding information of the to-be-converted word is obtained on the basis of the converted word, not only the amount of calculation for encoding and conversion is reduced, but also a real-time speech-to-text translation of the to-be-converted word may be achieved because the influence of the following words does not need to be considered.

Figure 9:
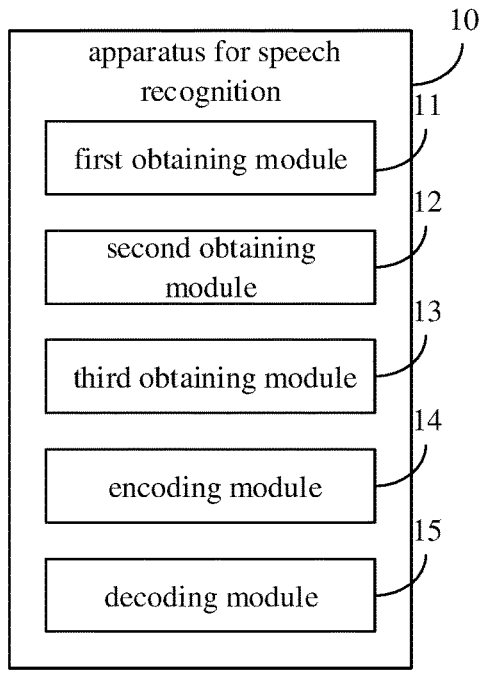
FIG. 9 is a schematic block diagram of an apparatus for speech recognition provided by an embodiment of present disclosure.

FIG. 9 is a schematic block diagram of an apparatus for speech recognition provided by an embodiment of the application.

As shown in FIG. 9, the apparatus 10 for speech recognition includes: a first obtaining module 11, configured to obtain audio data to be recognized; a second obtaining module 12, configured to decode the audio data to obtain a first syllable of a to-be-converted word, in which the first syllable is a combination of at least one phoneme corresponding to the to-be-converted word; a third obtaining module 13, configured to obtain a sentence to which the to-be-converted word belongs and a converted word in the sentence, and obtain a second syllable of the converted word; an encoding module 14, configured to encode the first syllable and the second syllable to generate first encoding information of the first syllable; and a decoding module 15, configured to decode the first encoding information to obtain a text corresponding to the to-be-converted word.

In some embodiments, the encoding module 14 includes: a first obtaining unit, configured to extract a first phrase embedding vector of the first syllable and a second phrase embedding vector of the second syllable respectively; and an encoding information generating module, configured to generate the first encoding information based on the first phrase embedding vector and the second phrase embedding vector.

In some embodiments, the encoding information generating unit includes: a first generating sub-unit, configured to generate a first query vector and a key vector of the first syllable based on the first phrase embedding vector and the second phrase embedding vector; a second generating sub-unit, configured to generate an encoding increment of the first syllable based on the first query vector and the key vector; and a third generating sub-unit, configured to generate the first encoding information based on the encoding increment and second encoding information of the second syllable.

In some embodiments, the second generating sub-unit includes: a first generating component, configured to generate a self-attention weight matrix of the first syllable based on the first query vector and the key vector, in which weight values in the self-attention weight matrix is configured to represent a correlation degree between syllables; a second generating component, configured to generate a value vector of the first syllable based on the first syllable and the second syllable; and a third generating component, configured to weight the value vector based on the self-attention weight matrix to generate the encoding increment.

In some embodiments, there are a plurality of second syllables, and the first generating sub-unit includes: a fourth generating component, configured to construct a first query vector of the first syllable based on the first phrase embedding vector of the first syllable; a fifth generating component, configured to construct a second query vector of the second syllable by using the second phrase embedding vector of each second syllable; and a sixth generating component, configured to splice the first query vector with the second query vector to generate the key vector.

In some embodiments, the first generating component is configured to: obtain a transposed vector of the key vector; multiply the first query vector by the transposed vector to generate a first matrix; and normalize the first matrix to generate the self-attention weight matrix.

In some embodiments, the third generating sub-unit is configured to: splice the encoding increment with the second encoding information to obtain the first encoding information.

In some embodiments, the encoding module comprises N encoding components, and N is a positive integer, when N is greater than 1, the first encoding component to the N-th encoding component are connected in sequence, and in the first encoding component, the first generating sub-unit is configured to generate the first query vector based on the first phrase embedding vector of the first syllable; in an i-th encoding component, the first generating sub-unit is configured to determine the encoding increment of the first syllable obtained by an (i-1)th encoding component as the first query vector of the first syllable in the i-th encoding component, where i is a positive integer greater than 1 and smaller than or equal to N.

In some embodiments, in the first encoding component, the first generating sub-unit is configured to splice the first query vector with the second query vector of each second syllable to obtain the key vector of the first syllable; in the i-th encoding component, the first generating sub-unit is configured to determine the first encoding information of the first syllable obtained by the (i-1)th encoding component as the key vector of the first syllable in the i-th encoding component, where i is a positive integer greater than 1 and smaller than or equal to N.

Figure 10:
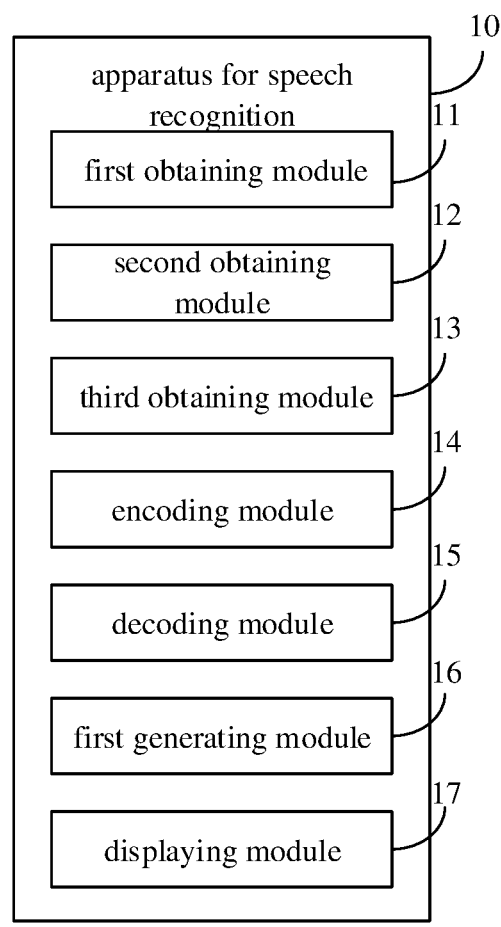
FIG. 10 is a schematic block diagram of an apparatus for speech recognition provided by another embodiment of present disclosure.

In some embodiments, as shown in FIG. 10, the apparatus for speech recognition 10 further includes: a first generating module 16, configured to generate first display information based on the text corresponding to the to-be-converted word, and splice the first display information with the second display information currently on a screen to generate third display information; and a display module 17, configured to display the third display information on the screen.

In some embodiments, the displaying module 17 is specifically configured to: perform semantic analysis on the third display information to predict a number of words in the sentence; determine a display position of the third display information on the screen based on the number; and control the third display information to be displayed on the display position.

In some embodiments, the displaying module 17 is specifically configured to: obtain a number of words in the third display information; and adjust word spacing in the third display information based on the number.

In some embodiments, the second obtaining module 12 is specifically configured to: obtain a first candidate posterior probability of the first syllable of the audio data by using an acoustic model; obtain a second candidate posterior probability of the first syllable of the audio data by using a speech model; crop the first candidate posterior probability based on the second candidate posterior probability to obtain the first syllable with the largest probability.

It should be noted that the foregoing explanation of the embodiment of the method for speech recognition is also applicable to the apparatus for speech recognition of some embodiments, and will not be repeated here.

Based on the technology of present disclosure, the current to-be-converted word can be encoded based on the current to-be-converted word and the converted word in the sentence to which the to-be-converted word belongs. During the encoding process, only the influence of the previous converted word on the to-be-converted word is considered, and the words after the to-be-converted word is no longer considered. The speech-to-text efficiency will be improved effectively while ensuring accuracy, without the need to input the entire sentence of the speech to be converted. Further, when performing speech-to-text conversion based on the above-mentioned encoding, since the encoding information of the to-be-converted word is obtained on the basis of the converted word, not only the amount of calculation for encoding and conversion is reduced, but also a real-time speech-to-text translation of the to-be-converted word may be achieved because the influence of the following words does not need to be considered.

Based on the embodiments of the present disclosure, the present disclosure also provides an electronic device and a readable storage medium.

Figure 11:
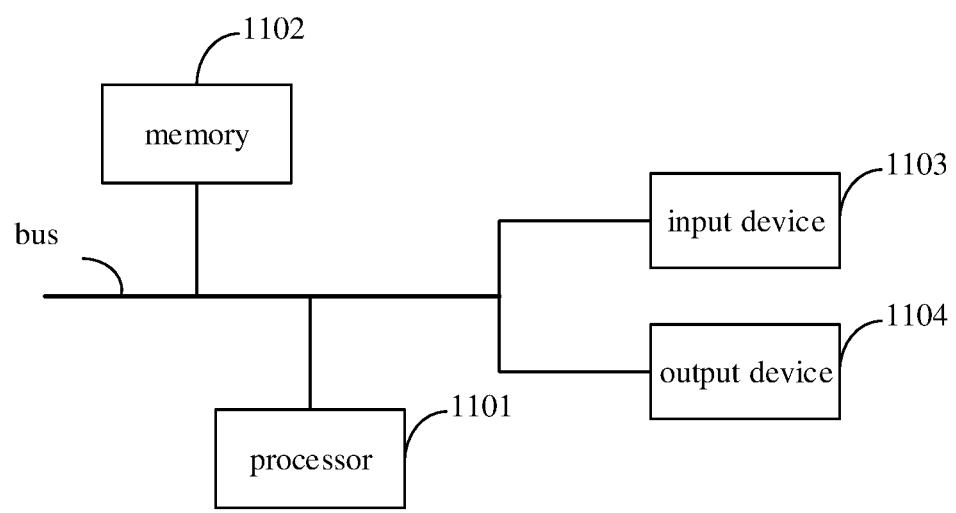
FIG. 11 is a block diagram of an electronic device used to implement a method for speech recognition according to an embodiment of the present disclosure.

As shown in FIG. 11, FIG. 11 is a block diagram of an electronic device used to implement a method for speech recognition according to an embodiment of the present disclosure. The electronic device aims to represent various forms of digital computers, such as a laptop computer, a desktop computer, a workstation, a personal digital assistant, a server, a blade server, a mainframe computer and other suitable computers. The electronic device may also represent various forms of mobile devices, such as a personal digital processing, a cellular phone, a smart phone, a wearable device and other similar computing devices. The components, connections and relationships of the components, and functions of the components illustrated herein are merely examples, and are not intended to limit the implementation of the present disclosure described and/or claimed herein.

As illustrated in FIG. 11, the electronic device includes: one or more processors 1101, a memory 1102, and interfaces for connecting various components, including a high-speed interface and a low-speed interface. Various components are connected to each other with different buses, and may be mounted on a common main board or mounted in other ways as required. The processor may process instructions executed within the electronic device, including instructions stored in or on the memory to display graphical information of the GUI (graphical user interface) on an external input/output device (such as a display device coupled to an interface). In other implementations, a plurality of processors and/or a plurality of buses may be used together with a plurality of memories if necessary. Similarly, a plurality of electronic devices may be connected, and each electronic device provides a part of necessary operations (for example, as a server array, a group of blade servers, or a multiprocessor system). In FIG. 11, one processor 1101 is taken as an example.

The memory 1102 is a non-transitory computer readable storage medium based on the present disclosure. The memory is configured to store instructions executable by at least one processor, to cause the at least one processor to execute a method for testing a dialogue platform based on the present disclosure. The non-transitory computer readable storage medium based on the present disclosure is configured to store computer instructions. The computer instructions are configured to enable a computer to execute the method for testing a dialogue platform based on the present disclosure.

As the non-transitory computer readable storage medium, the memory 1102 may be configured to store non-transitory software programs, non-transitory computer executable programs and modules, such as program instructions/modules (such as, the first obtaining module 11, the second obtaining module 12, the second obtaining module 13, the encoding module 14 and the decoding module 15 illustrated in FIG. 9) corresponding to the method for testing a dialogue platform based on embodiments of the present disclosure. The processor 1101 executes various functional applications and data processing of the server by operating non-transitory software programs, instructions and modules stored in the memory 1102, that is, implements the method for controlling the vehicle based on the above method embodiment.

The memory 1102 may include a storage program region and a storage data region. The storage program region may store an application required by an operating system and at least one function. The storage data region may store data created based on usage of the electronic device for testing a dialogue platform. In addition, the memory 1102 may include a high-speed random access memory, and may also include a non-transitory memory, such as at least one disk memory device, a flash memory device, or other non-transitory solid-state memory device. In some embodiments, the memory 1102 may optionally include memories remotely located to the processor 1101 which may be connected to the electronic device capable of testing a dialogue platform via a network. Examples of the above network include, but are not limited to, the Internet, an intranet, a local area network, a mobile communication network and combinations thereof.

The electronic device capable of performing speech recognition may also include: an input device 1103 and an output device 1104. The processor 1101, the memory 1102, the input device 1103, and the output device 1104 may be connected through a bus or in other means. In FIG. 11, the bus is taken as an example.

The input device 1103 may receive input digitals or character information, and generate key signal input related to user setting and function control of the electronic device capable of testing a dialogue platform, such as a touch screen, a keypad, a mouse, a track pad, a touch pad, an indicator stick, one or more mouse buttons, a trackball, a joystick and other input device. The output device 1104 may include a display device, an auxiliary lighting device (e.g., LED), a haptic feedback device (e.g., a vibration motor), and the like. The display device may include, but be not limited to, a liquid crystal display (LCD), a light emitting diode (LED) display, and a plasma display. In some embodiments, the display device may be a touch screen.

The various implementations of the system and technologies described herein may be implemented in a digital electronic circuit system, an integrated circuit system, an application specific ASIC (application specific integrated circuit), a computer hardware, a firmware, a software, and/or combinations thereof. These various implementations may include: being implemented in one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit the data and the instructions to the storage system, the at least one input device and the at least one output device.

These computing programs (also called programs, software, software applications, or codes) include machine instructions of programmable processors, and may be implemented by utilizing high-level procedures and/or object-oriented programming languages, and/or assembly/machine languages. As used herein, the terms "machine readable medium" and "computer readable medium" refer to any computer program product, device, and/or apparatus (such as, a magnetic disk, an optical disk, a memory, a programmable logic device (PLD)) for providing machine instructions and/or data to a programmable processor, including machine readable medium that receives machine instructions as machine readable signals. The term "machine readable signal" refers to any signal for providing the machine instructions and/or data to the programmable processor.

To provide interaction with a user, the system and technologies described herein may be implemented on a computer. The computer has a display device (such as, a CRT (cathode ray tube) or a LCD (liquid crystal display) monitor) for displaying information to the user, a keyboard and a pointing device (such as, a mouse or a trackball), through which the user may provide the input to the computer. Other types of devices may also be configured to provide interaction with the user. For example, the feedback provided to the user may be any form of sensory feedback (such as, visual feedback, auditory feedback, or tactile feedback), and the input from the user may be received in any form (including acoustic input, speech input or tactile input).

The system and technologies described herein may be implemented in a computing system including a background component (such as, a data server), a computing system including a middleware component (such as, an application server), or a computing system including a front-end component (such as, a user computer having a graphical user interface or a web browser through which the user may interact with embodiments of the system and technologies described herein), or a computing system including any combination of such background component, the middleware components, or the front-end component. Components of the system may be connected to each other through digital data communication in any form or medium (such as, a communication network). Examples of the communication network include a local area network (LAN), a wide area networks (WAN), and the Internet.

The computer system may include a client and a server. The client and the server are generally remote from each other and usually interact via the communication network. A relationship between the client and the server is generated by computer programs operated on a corresponding computer and having a client-server relationship with each other.

Based on the technology of present disclosure, the current to-be-converted word can be encoded based on the current to-be-converted word and the converted word in the sentence to which the to-be-converted word belongs. During the encoding process, only the influence of the previous converted word on the to-be-converted word is considered, and the words after the to-be-converted word is no longer considered. The speech-to-text efficiency will be improved effectively while ensuring accuracy, without the need to input the entire sentence of the speech to be converted. Further, when performing speech-to-text conversion based on the above-mentioned encoding, since the encoding information of the to-be-converted word is obtained on the basis of the converted word, not only the amount of calculation for encoding and conversion is reduced, but also a real-time speech-to-text translation of the to-be-converted word may be achieved because the influence of the following words does not need to be considered.

It should be understood that, steps may be reordered, added or deleted by utilizing flows in the various forms illustrated above. For example, the steps described in the present disclosure may be executed in parallel, sequentially or in different orders, so long as desired results of the technical solution disclosed by the present disclosure may be achieved without limitation herein.

The above detailed implementations do not limit the protection scope of the present disclosure. It should be understood by the skilled in the art that various modifications, combinations, sub-combinations and substitutions may be made based on design requirements and other factors. Any modification, equivalent substitution and improvement made within the spirit and the principle of the present disclosure shall be included in the protection scope of present disclosure.

What is claimed is:

1. A method for speech recognition, comprising:
    obtaining audio data to be recognized;
    performing streaming decoding on the audio data to obtain a first syllable of a to-be-converted word one by one, wherein the first syllable comprises at least one phoneme corresponding to the to-be-converted word;

obtaining a converted word of a sentence to which the to-be-converted word belongs and a second syllable of the converted word, wherein the converted word is obtained by performing speech-to-text processing in a streaming mode on all syllables before the to-be-converted word;

encoding the first syllable and the second syllable to generate first encoding information of the first syllable; and decoding the first encoding information to obtain a text corresponding to the to-be-converted word, thereby obtaining an entire sentence corresponding to the audio data, wherein the encoding the first syllable and the second syllable to generate the first encoding information of the first syllable comprises:

extracting a first phrase embedding vector of the first syllable and a second phrase embedding vector of the second syllable respectively; and generating a first query vector and a key vector of the first syllable based on the first phrase embedding vector and the second phrase embedding vector;

generating an encoding increment of the first syllable based on the first query vector and the key vector; and generating the first encoding information based on the encoding increment and second encoding information of the second syllable.

2. The method of claim 1, wherein generating the encoding increment of the first syllable based on the first query vector and the key vector comprises:

generating a self-attention weight matrix of the first syllable based on the first query vector and the key vector, wherein weight values in the self-attention weight matrix is configured to represent a correlation degree between syllables;

generating a value vector of the first syllable based on the first syllable and the second syllable; and weighting the value vector based on the self-attention weight matrix to generate the encoding increment.

3. The method of claim 1, wherein there are a plurality of second syllables, and generating the first query vector and the key vector of the first syllable based on the first phrase embedding vector and the second phrase embedding vector comprises:

constructing a first query vector of the first syllable based on the first phrase embedding vector of the first syllable;

constructing a second query vector of the second syllable by using the second phrase embedding vector of each second syllable; and splicing the first query vector with the second query vector to generate the key vector.

4. The method of claim 2, wherein generating the self-attention weight matrix of the first syllable based on the first query vector and the key vector comprises:

obtaining a transposed vector of the key vector;

multiplying the first query vector by the transposed vector to generate a first matrix; and normalizing the first matrix to generate the self-attention weight matrix.

5. The method of claim 1, wherein generating the first encoding information based on the encoding increment and the second encoding information of the second syllable comprises:

splicing the encoding increment with the second encoding information to obtain the first encoding information.

6. The method of claim 3, wherein the first syllable is encoded by an encoder, the encoder comprises N encoding components, and N is a positive integer, when N is greater than 1, the first encoding component to the N-th encoding component are connected in sequence, and the method further comprises:

in the first encoding component, generating the first query vector based on the first phrase embedding vector of the first syllable; and in an i-th encoding component, determining the encoding increment of the first syllable obtained by an (i-1)th encoding component as the first query vector of the first syllable in the i-th encoding component, where i is a positive integer greater than 1 and smaller than or equal to N.

7. The method of claim 6, further comprising:

in the first encoding component, splicing the first query vector with the second query vector of each second syllable to obtain the key vector of the first syllable; and in the i-th encoding component, determining the first encoding information of the first syllable obtained by the (i-1)th encoding component as the key vector of the first syllable in the i-th encoding component.

8. The method of claim 1, further comprising:

generating first display information based on the text corresponding to the to-be-converted word, and splicing the first display information with second display information currently on a screen to generate third display information; and displaying the third display information on the screen.

9. The method of claim 8, wherein displaying the third display information on the screen comprises:

performing semantic analysis on the third display information to predict a number of words in the sentence;

determining a display position of the third display information on the screen based on the number; and controlling the third display information to be displayed on the display position.

10. The method of claim 8, wherein displaying the third display information on the screen comprises:

obtaining a number of words in the third display information; and adjusting word spacing in the third display information based on the number.

11. The method of claim 1, wherein decoding the audio data to obtain the first syllable of the to-be-converted word comprises:

obtaining a first candidate posterior probability of the first syllable of the audio data by using an acoustic model;

obtaining a second candidate posterior probability of the first syllable of the audio data by using a speech model;

cropping the first candidate posterior probability based on the second candidate posterior probability to obtain the first syllable with the largest probability.

12. An apparatus for speech recognition, comprising: a non-transitory computer-readable medium including computer-executable instructions stored thereon, and an instruction execution system which is configured by the instructions to implement at least one of:

a first obtaining module, configured to obtain audio data to be recognized;

a second obtaining module, configured to perform streaming decoding on the audio data to obtain a first syllable of a to-be-converted word one by one, wherein the first syllable comprises at least one phoneme corresponding to the to-be-converted word;

a third obtaining module, configured to obtain a converted word of a sentence to which the to-be-converted word belongs and a second syllable of the converted word, wherein the converted word is obtained by performing speech-to-text processing in a streaming mode on all syllables before the to-be-converted word;

an encoding module, configured to encode the first syllable and the second syllable to generate first encoding information of the first syllable; and a decoding module, configured to decode the first encoding information to obtain a text corresponding to the to-be-converted word, thereby obtaining an entire sentence corresponding to the audio data, wherein the encoding module comprises:

a first obtaining unit, configured to extract a first phrase embedding vector of the first syllable and a second phrase embedding vector of the second syllable respectively; and an encoding information generating unit, configured to generate the first encoding information based on the first phrase embedding vector and the second phrase embedding vector, wherein the encoding information generating unit comprises:

a first generating sub-unit, configured to generate a first query vector and a key vector of the first syllable based on the first phrase embedding vector and the second phrase embedding vector;

a second generating sub-unit, configured to generate an encoding increment of the first syllable based on the first query vector and the key vector; and a third generating sub-unit, configured to generate the first encoding information based on the encoding increment and second encoding information of the second syllable.

13. The apparatus of claim 12, wherein the second generating sub-unit comprises:

a first generating component, configured to generate a self-attention weight matrix of the first syllable based on the first query vector and the key vector, wherein weight values in the self-attention weight matrix is configured to represent a correlation degree between syllables;

a second generating component, configured to generate a value vector of the first syllable based on the first syllable and the second syllable; and a third generating component, configured to weight the value vector based on the self-attention weight matrix to generate the encoding increment.

14. The apparatus of claim 12, wherein there are a plurality of second syllables, and the first generating sub-unit comprises:

a fourth generating component, configured to construct a first query vector of the first syllable based on the first phrase embedding vector of the first syllable;

a fifth generating component, configured to construct a second query vector of the second syllable by using the second phrase embedding vector of each second syllable; and a sixth generating component, configured to splice the first query vector with the second query vector to generate the key vector.

15. The apparatus of claim 13, wherein the first generating component is configured to:

obtain a transposed vector of the key vector;

multiply the first query vector by the transposed vector to generate a first matrix; and normalize the first matrix to generate the self-attention weight matrix.

16. A non-transitory computer-readable storage medium having computer instructions stored thereon, wherein the computer instructions are configured to cause a computer to execute a method for speech recognition, and the method comprises:

obtaining audio data to be recognized;

performing streaming decoding on the audio data to obtain a first syllable of a to-be-converted word one by one, wherein the first syllable comprises at least one phoneme corresponding to the to-be-converted word;

obtaining a converted word of a sentence to which the to-be-converted word belongs and a second syllable of the converted word, wherein the converted word is obtained by performing speech-to-text processing in a streaming mode on all syllables before the to-be-converted word;

encoding the first syllable and the second syllable to generate first encoding information of the first syllable; and decoding the first encoding information to obtain a text corresponding to the to-be-converted word, thereby obtaining an entire sentence corresponding to the audio data, wherein the encoding the first syllable and the second syllable to generate the first encoding information of the first syllable comprises:

extracting a first phrase embedding vector of the first syllable and a second phrase embedding vector of the second syllable respectively;

generating a first query vector and a key vector of the first syllable based on the first phrase embedding vector and the second phrase embedding vector;

generating an encoding increment of the first syllable based on the first query vector and the key vector; and generating the first encoding information based on the encoding increment and second encoding information of the second syllable.

* * * * *